United States Patent

[11] 3,617,833

[72] Inventors: Sidney D. Ross, Williamstown, Mass.; Raynor Linzey, Stamford, Conn.
[21] Appl. No.: 009,713
[22] Filed: Feb. 9, 1970
[45] Patented: Nov. 2, 1971
[73] Assignee: Sprague Electric Company, North Adams, Mass.

[54] SILICATE-IMPREGNATED POLYOLEFIN CAPACITOR
6 Claims, 1 Drawing Fig.

[52] U.S. Cl. .................. 317/258, 317/260
[51] Int. Cl. .................. H01g 3/175
[50] Field of Search .................. 317/258, 259, 260; 252/63.7; 336/58, 94; 174/17 LF

[56] References Cited
UNITED STATES PATENTS
2,788,327   4/1957   Ross et al. .................. 317/259 X
3,363,156   1/1968   Cox .................. 317/259

Primary Examiner—Laramie E. Askin
Attorneys—Connolly and Hutz, Vincent H. Sweeney, James Paul O'Sullivan and David R. Thornton ABSTRACT: Polyolefin film dielectric capacitors are impregnated with a dielectric of a tetraalkyl orthosilicate to yield high corona starting voltage capacitors.

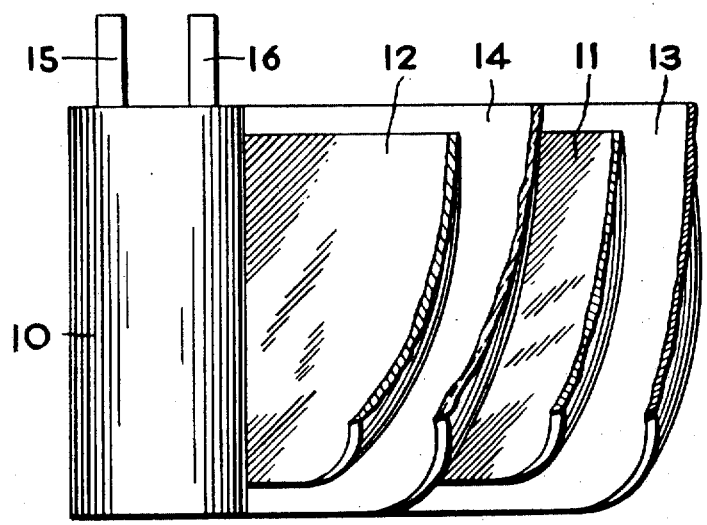

3,617,833

SILICATE-IMPREGNATED POLYOLEFIN CAPACITOR

BACKGROUND OF THE INVENTION

The present invention is concerned with electrical capacitors having high corona starting voltage characteristics.

Recently polyolefin film capacitors e.g., polypropylene, have been reported to be capable of being fully impregnated with a dielectric liquid of the type comprising a halogenated aromatic compound having from 1 to 5 chlorine substituents and from 1 to 3 aryl groups. It is maintained that corona starting voltage tests on units of this type have indicated that the liquid dielectric has completely impregnated all of the capacitor including the polyolefin film. It has been determined, however, that it is only with extreme difficulty that this type of unit can be impregnated, even when employing a paper dielectric film as a wicking aid in conjunction with the polypropylene film. As an illustration of the difficulty involved in fully impregnating polypropylene with a commercially available halogenated aromatic dielectric fluid, it has taken anywhere from one to three weeks at about 90° C., to cause the polypropylene film to takeup about 11 percent by weight of the liquid while at the same time dissolving about 1 percent by weight of the film in the dielectric liquid.

In view of this difficulty, it has been found necessary, for the impregnation of commercial units, to employ with the polypropylene film, a porous cellulosic dielectric, e.g., Kraft paper, and also to employ special heat cycling procedures, after initial impregnation of the unit, in order to achieve maximum impregnation of the device. Such means obviously increase the cost of the unit. It would be a considerable advance in the art to be able to employ polypropylene film as the sole film dielectric in a capacitor and also to employ a fluid dielectric which can easily and completely impregnate the unit.

It is an object of the invention to present a capacitor capable of operation at higher voltage stresses having high volumetric efficiency.

Another object of the invention is to provide an electrical capacitor having extremely high corona starting voltage characteristics.

It is yet another object of the present invention to provide an all polyolefin film dielectric capacitor characterized by ease of fluid dielectric impregnation.

Other objects and advantages of the present invention will be made obvious to those skilled in the art by the following description when considered in relation to the accompanying drawing of which: the sole FIGURE shows a partially unrolled convolutely wound capacitor of the type employed in the present invention.

SUMMARY OF THE INVENTION

In accordance with the present invention there is provided a capacitance section sealed within a capacitor housing means. The capacitance section comprises at least a pair of electrodes and a polyolefin dielectric spacer between the electrodes. The capacitor is fully impregnated with at least a major proportion of a tetraalkyl orthosilicate. The alkyl groups of the orthosilicate are either straight or branched chain and preferably have from six to 18 carbon atoms therein.

In another embodiment of the invention the tetraalkyl orthosilicate dielectric may contain up to 45 percent by weight of conventional fluid dielectrics, for example, a fluid halogenated aromatic compound having from 1–5 chlorine substituents and from 1–3 aryl groups, mineral oil, cottonseed oil, silicone oil, etc.

In another embodiment of the invention a conventional porous film dielectric of the cellulosic type e.g., Kraft paper, may be employed in conjunction with the polyolefin film. This film will function as a wick which will lead in the fluid dielectric to the interior of the unit and facilitate its contact with the polyolefin film.

BRIEF DESCRIPTION OF THE DRAWING

Other objects and advantages of the present invention will be made obvious to those skilled in the art by the following description when considered in relation to the accompanying drawing of which:

The sole FIGURE shows a partially unrolled convolutely wound capacitor of the type employed in the present invention.

The drawing illustrates a capacitance section 10 of the type with which the present invention is concerned. This section will be positioned within a capacitor container or housing (not shown) and later impregnated with the fluid dielectric of the present invention. Section 10 comprises a convolutely wound section having metal electrodes 11 and 12 separated by polyolefin films 13 and 14. The capacitance section has electrode tabs 15 and 16 which are in contact with electrodes 11 and 12 and which will thereafter make contact to the underside of a conventional capacitor can cover assembly, containing tab terminals.

DETAILED DESCRIPTION OF THE INVENTION

It has been determined, with respect to dielectric fluid impregnated AC capacitors, that there is a close correlation between the degree of impregnation and the corona start voltage (CSV) of the unit. When the corona start voltage approaches a maximum or is comparatively high, it has been found that there has also been a substantially complete impregnation of the unit. On the other hand when the corona start voltage is low, it has been found that there has been poor or incomplete liquid impregnation of the unit. The following example illustrates the preparation of capacitors of the present invention and the corona start voltage data indicates that the units have been completely or at least substantially completely impregnated.

EXAMPLE

Four, 0.2 microfarad, convolutely wound capacitors were prepared employing a single thickness of 0.5 mil polypropylene film separating 0.25 mil aluminum foils. The units were placed in a conventional metal container and closed with terminal-containing can covers also of conventional design. The covers contain a small fill-hole therein. The capacitor units were vacuum dried and impregnated through the fill-hole with tetra-2-ethylhexyl orthosilicate at a temperature of about 90° C. over a period of about one-half hour. The fill-hole was sealed and the units were not subjected to the common practice of a heat cycle to enhance impregnation of the units.

The units were then tested according to standard procedures for corona starting voltage. In three of the four units, the capacitance sections broke down ($E_{b.d.}$ >3,000 VAC/mil) before corona start. In the fourth unit corona started at 3,800 VAC/mil.

By way of comparison, identical units, impregnated in the same manner, but with a commercially available halogenated aromatic dielectric fluid, revealed a corona starting voltage of from about 800–1,100 VAC/mil. The comparatively high breakdown and high corona starting voltage of the units of the present invention indicate that substantially complete fluid dielectric impregnation had been obtained. On the other hand, the low corona starting voltage of the comparison units indicate that they were not fully impregnated with the halogenated aromatic fluid dielectric.

The ease of silicate impregnation of polypropylene was further confirmed by simple beaker tests which established that after one-half hour at 90° C., a film of 0.5 mil polypropylene absorbed about 6 percent by weight of tetra-2-ethylhexyl orthosilicate. The film thickness increased by about 10 percent. Prolonging the test beyond one-half hour did not increase the amount of silicate absorbed nor did it increase the thickness of the film.

The polyolefin films contemplated by the present invention include polypropylene, polyethylene, polystyrene, etc. It is preferred to employ isotactic polypropylene of fairly high purity. This type of polypropylene is presently commercially available from several different sources. For some purposes it is advisable to employ in conjunction with the polyolefin film a porous cellulosic type spacer to assist in impregnation and to act as a wick for the fluid impregnant. A commonly employed material for this purpose is Kraft paper.

While the specific example herein has shown the use of tetra-2-ethylhexyl orthosilicate as the impregnant, it is to be understood that other silicates defined by the general formula $(RO)_4Si$ can be employed. Within this broad definition the R group can be an alkyl group having from six to 18 carbon atoms in straight or branched chain configuration. The R groups of the silicate may be all the same or may or may be different alkyl groups. Typical examples of the alkyl groups are 2-ethylbutyl, 2-ethylhexyl, 1,3-dimethylbutyl, 2-methylpentyl, 1-ethylpentyl, 1-methylhexyl, etc. It is also to be understood that the alkyl groups of the silicate may contain aromatic or chlorine-containing aromatic substituents.

Also, while the specific example has shown the use of an orthosilicate as the sole impregnant, it is to be understood that the contemplated silicates may be combined or blended with other compatible prior art dielectric impregnants in order to obtain specific advantages. For example, in order to improve the impregnation characteristics of a commercially available chlorinated hydrocarbon such as Clorinol* (a mixture of chlorinated diphenyls containing about 42 percent by weight chlorine), up to about 45 percent by volume of this material may be blended with the orthosilicate. This will impart to the Clorinol the advantages of the silicate while at the same time taking advantage of the low cost of the Clorinol. The use of a chlorinated hydrocarbon as part of the liquid impregnant will also impart fire proofing characteristics to the impregnant. In addition to chlorinated hydrocarbons, other commonly used liquid impregnants such as mineral oil, silicone oil, cottonseed oil, etc., may also be employed. *Registered Trademark – Sprague Electric Company Where only nonchlorine containing silicates are employed herein there is no need to add prior art epoxy type stabilizers since there is no possibility of generating hydrochloric acid to be scavenged. Where either chlorine-containing silicates or silicates mixed with chlorine-containing liquid dielectrics are employed certain epoxy type stabilizers such as dipentene dioxide, 1-epoxyethyl, 3,4-epoxycyclohexane, etc., may be added to these liquid impregnants. While aluminum has been illustrated as one electrode material useful in the present invention other metal foils, for example, tin, lead, silver, etc., may also be employed. It is also contemplated that one or both of the capacitor electrodes may be in the form of a thin metallization on the surface of the polyolefin film. An example of this form is aluminized polypropylene.

Since it is obvious that many changes and modifications can be made in the above described details without departing from the nature and spirit of the invention, it is to be understood that the invention is not limited to such details except as set forth in the appended claims.

What is claimed is:

1. An electrical capacitor comprising a capacitance section having at least a pair of electrodes convolutely wound in contact with at least one polyolefin dielectric spacer between said electrodes, said section being fully impregnated with a liquid dielectric consisting essentially of a tetraalkyl orthosilicate, wherein the alkyl group is straight or branched chain and has from six to 18 carbon atoms.

2. The capacitor of claim 1 wherein said polyolefin is polypropylene.

3. The capacitor of claim 2 wherein said liquid dielectric is tetra-2-ethylhexyl orthosilicate.

4. The capacitor of claim 2 wherein said liquid dielectric is tetra-2-ethylbutylorthosilicate.

5. The capacitor of claim 1 wherein at least one of said electrodes is in the form of a metallization layer deposited on a surface of said polyolefin spacer.

6. The capacitor of claim 5 wherein said metallization is aluminum.

* * * * *